(12) United States Patent
Rastogi et al.

(10) Patent No.: US 12,101,705 B2
(45) Date of Patent: Sep. 24, 2024

(54) METHOD TO OPTIMIZE PWS MESSAGE RECEPTION IN MULTI-SIM MULTI-STANDBY UE AND UE THEREOF

(71) Applicant: SAMSUNG ELECTRONICS CO., LTD., Suwon-si (KR)

(72) Inventors: Akshay Rastogi, Bangalore (IN); Meha Goel, Bangalore (IN); Shrinath Ramamoorthy Madhurantakam, Bangalore (IN); Arunakumar Bettappanavar, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 356 days.

(21) Appl. No.: 17/658,307

(22) Filed: Apr. 7, 2022

(65) Prior Publication Data
US 2023/0247409 A1 Aug. 3, 2023

(30) Foreign Application Priority Data
Jan. 28, 2022 (IN) .............................. 202241004738

(51) Int. Cl.
*H04W 4/90* (2018.01)
*H04W 4/06* (2009.01)
(Continued)

(52) U.S. Cl.
CPC ............... *H04W 4/90* (2018.02); *H04W 4/06* (2013.01); *H04W 4/12* (2013.01); *H04W 88/06* (2013.01)

(58) Field of Classification Search
CPC ........... H04W 4/90; H04W 4/06; H04W 4/12; H04W 88/06; H04W 48/12; H04W 8/183; H04W 12/45; H04W 76/50; H04W 68/005
See application file for complete search history.

(56) References Cited

U.S. PATENT DOCUMENTS 9,148,872 B2    9/2015    Dhanda et al.
9,578,473 B1    2/2017    Ponukumati et al.
(Continued)

FOREIGN PATENT DOCUMENTS

CN    113141576    7/2021
WO    2017004147    1/2017

OTHER PUBLICATIONS

Extended European Search Report dated Jun. 22, 2023 in corresponding European Patent Application No. 22206181.4 (8 pages).

*Primary Examiner* — Kabir A Timory
(74) *Attorney, Agent, or Firm* — F. CHAU & ASSOCIATES, LLC (57) ABSTRACT

A method for optimizing PWS message reception in multi-SIM multi-standby UE and UE thereof are disclosed. In an embodiment, the method includes receiving a scheduling information of SIBs containing a PWS message from a first network entity and the scheduling information of SIBs containing the PWS message from second network entity. The method checks whether a PWS message identifier is present in a primary CBS configuration list of the first SIM and if so, receives the SIBs based on the scheduling information. The method checks whether the PWS message identifier is present in a secondary CBS configuration list of the second SIM, and terminates reception of the SIBs by the second SIM when the PWS message identifier is absent. A CBS notification is sent by the first SIM, containing the PWS message to a CBS controller in the absence of error while receiving the PWS message from the SIBs.

20 Claims, 5 Drawing Sheets

(51) Int. Cl.
_H04W 4/12_  (2009.01)
_H04W 88/06_ (2009.01)

(56) References Cited

U.S. PATENT DOCUMENTS

| | | |
|---|---|---|
| 11,595,808 B2 * | 2/2023 | Li .................. H04W 72/12 |
| 2019/0380019 A1 | 12/2019 | Buckley et al. |
| 2021/0377716 A1 | 12/2021 | Rej et al. |

* cited by examiner

METHOD TO OPTIMIZE PWS MESSAGE RECEPTION IN MULTI-SIM MULTI-STANDBY UE AND UE THEREOF

CROSS REFERENCE TO RELATED APPLICATION

This application claims priority to India application no. 202241004738 filed in the Indian Intellectual Property Office on Jan. 28, 2022, the content of which is incorporated herein by reference in its entirety.

TECHNICAL FIELD

The present disclosure generally relates to telecommunications, and more particularly to Public Warning System (PWS) message reception in a multi-Subscriber Identity Module (SIM) multi-standby User Equipment (UE).

DISCUSSION OF THE RELATED ART

The Public Warning System (PWS) is a system that alerts and informs citizens threatened by a hazard, enabling them to prepare and to act in a timely manner to reduce the impact of the hazard. Tornados, tsunamis, hurricanes, floods, volcanoes, and release of deadly gases are some examples of dangerous situations where the PWS is used to save lives. The PWS is also employed for localized, day-to-day, life-at-risk situations, for instance, asking the public to help search for missing children, to report sighting of fugitive(s), and taking immediate action to stay safe during a gun shooting.

The 3GPP standard 22.268 defines PWS requirements for a mobile network and User Equipment (UE). The mobile network uses the Cell Broadcast System (CBS) to deliver public warning messages to end users. Cell Broadcast (CB) is a location-based technology that sends text messages to be displayed on a UE screen. The CB is a part of the mobile network signalling and therefore, has higher priority over other services for allocation of capacity. Thus, CB is designed to always operate, even when the mobile network is congested or deliberately shutdown for end users (i.e., users with SIM card-based access).

Cell Broadcast Entity (CBE) is the messaging interface to Cell Broadcast Centre (CBC). CBE is a user interface used by a message creator to both compile the message and then specify the location(s) of message recipients. Once defined, the message is sent to the CBC, which maps the target area to the mobile network cells and then sends the CB message to a required radio access network (e.g., 2G, 3G, 4G, 5G), which will manage the message broadcast to the end user.

With CB, it is possible to send a text message to within a specific area (local, regional or nationwide), which is received by a large number of subscribers whose UEs are configured to support and receive alerts. The subscribers may include visitors from other countries. Messages are sent in near real-time with location specific information, in the users' desired language and even if the mobile network is congested. The broadcast is repeated during a configurable period for the duration of the guidance to safety in that region. The message may be designed to expire after a single broadcast or after repeating the broadcast multiple times.

When a CB message is received by a user, it is displayed automatically on the screen of a user's UE (e.g., mobile phone) without any user interaction, with a special standardised ringtone and vibration, making the CB message instantly recognisable as an alert. In addition, the user needs to acknowledge the alert before being able to otherwise use the UE.

As per section 4.6.3 of 3GPP standard 22.268, battery life of PWS-enabled UEs shall not be significantly reduced by PWS. But with the usage of multi-SIM in UE, battery life of the UE may be seriously affected because every SIM in the multi-SIM will be receiving the broadcast. For instance, when the CB is repeated multiple times as in the case of Commercial Mobile Alert System (CMAS) reception, the UE redundantly reads the CMAS information carrying SIBs until such broadcast is stopped by the mobile network (for each broadcast, the information read by a second SIM may be redundant to that read by the first SIM).

As per section 5.2 of 3GPP standard 22.268, a primary notification shall be delivered within 4 seconds to the UE in the notification area (i.e., UE screen) even under a congestion situation. However, in the case of multi-SIM UEs, during message reception, there may be a delay in displaying the message to the user due to Radio Frequency (RF) chain conflicts when there is conflict in the paging cycle or the scheduling cycle of the System Information Blocks (SIBs) containing message segments. Furthermore, a SIM card of the multi-SIM UE on which internet data is stored may face a reduction in data throughput due to frequent RF chain sharing as well as RF chain conflicts between the SIMs, because a CBS message will be received on all the SIMs. For instance, in the case of CMAS message reception, the UE continues reading SIBs containing CBS message segments, redundantly (since the same SIB information is received for two SIMs), until such broadcast is stopped by the mobile network.

The information disclosed in this background of the disclosure section is only for enhancement of understanding of the general background of the inventive concept and should not be taken as an acknowledgement or any form of suggestion that this information forms the prior art already known to a person skilled in the art.

SUMMARY

Embodiments of the present disclosure may address the above-discussed problem associated with receiving a PWS message in a multi-SIM multi-standby UE.

In an embodiment, there is provided a method for optimizing Public Warning System (PWS) message reception in a multi-SIM multi-standby UE containing SIM cards of different operators. The method comprising receiving a scheduling information of System Information Blocks (SIBs) containing a PWS message in a broadcast information from a first network entity and the scheduling information of SIBs containing the PWS message in the broadcast information from a second network entity. The method checks whether a PWS message identifier associated with the PWS message is present in a primary Cell Broadcasting Service (CBS) configuration list of the first SIM and receives the SIBs based on the scheduling information when the PWS message identifier associated with the PWS message is present in the primary CBS configuration list of the first SIM. Subsequently, the method checks whether the PWS message identifier associated with the PWS message is present in a secondary CBS configuration list of the second SIM and terminates reception of the SIBs by the second SIM based on the scheduling information when the PWS message identifier associated with the PWS message is absent in the secondary CBS configuration list. Further, the method determines whether an error exists while receiving the PWS message from the SIBs, and if no such error exists, a CBS notification containing the PWS message is sent by the first SIM to a CBS controller of the UE.

In another embodiment, a method is provided for optimizing PWS message reception in a multi-SIM multi-standby UE containing SIM cards of the same operator. The method includes receiving a scheduling information of SIBs containing a PWS message in broadcast information from a network entity by each of first and second SIMS of the UE. The method checks whether a Cell Broadcasting Service (CBS) configuration list is present in the second SIM and terminates reception of the SIBs by the second SIM when the CBS configuration list is absent in the second SIM. The first SIM receives the SIBs based on the scheduling information when the PWS message identifier associated with the PWS message is present in the CBS configuration list of the first SIM, and determines whether an error exists while receiving the PWS message from the SIBs. The first SIM sends a CBS notification containing the PWS message to a CBS controller of the UE when no error exists while receiving the PWS message from the SIBs.

Embodiments of UEs respectively implementing the above methods may include a processor and a memory communicatively coupled to the processor, where the memory stores processor-executable instructions, which on execution by the processor, cause the processor to control operations that implement the respective method.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and together with the description, serve to explain the disclosed principles. The same numbers are used throughout the figures to reference like features and components. Some embodiments of system and/or methods in accordance with embodiments of the present subject matter are now described below, by way of example only, and with reference to the accompanying figures.

It should be appreciated by those skilled in the art that any block diagrams herein represent conceptual views of illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the following detailed description of embodiments of the inventive concept, reference is made to the accompanying drawings which illustrate specific embodiments in which the inventive concept may be practiced. These embodiments are described in sufficient detail to enable those skilled in the art to practice the inventive concept, and it is to be understood that other embodiments may be utilized and that changes may be made without departing from the scope of the inventive concept. The following description is, therefore, not to be taken in a limiting sense.

Abbreviations: Table 1 lists abbreviations that may be used in the present disclosure.

TABLE 1

| Abbreviation | Description |
| --- | --- |
| PWS | Public Warning System |
| SIM | Subscriber Identity Module |
| UE | User Equipment |
| CBS | Cell Broadcast System |
| CB | Cell Broadcast |
| CBE | Cell Broadcast Entity |
| CBC | Cell Broadcast Center |
| CMAS | Commercial Mobile Alert System |
| SIB | System Information Block |
| SIBs | System Information Blocks |
| DDS | Data Distribution Service |
| URL | Uniform Resource Locator |
| I/O interface | Input/Output interface |
| CDMA | Code-Division Multiple Access |
| HSPA+ | High-Speed Packet Access |
| GSM | Global System for Mobile communications |
| LTE | Long-Term Evolution |
| WiMax | Worldwide interoperability for Microwave access |
| RAID | Redundant Array of Independent Discs |
| ASIC | Application Specific Integrated Circuit |
| FPGA | Field-Programmable Gate Arrays |
| PGA | Programmable Gate Array |

Figure 1:
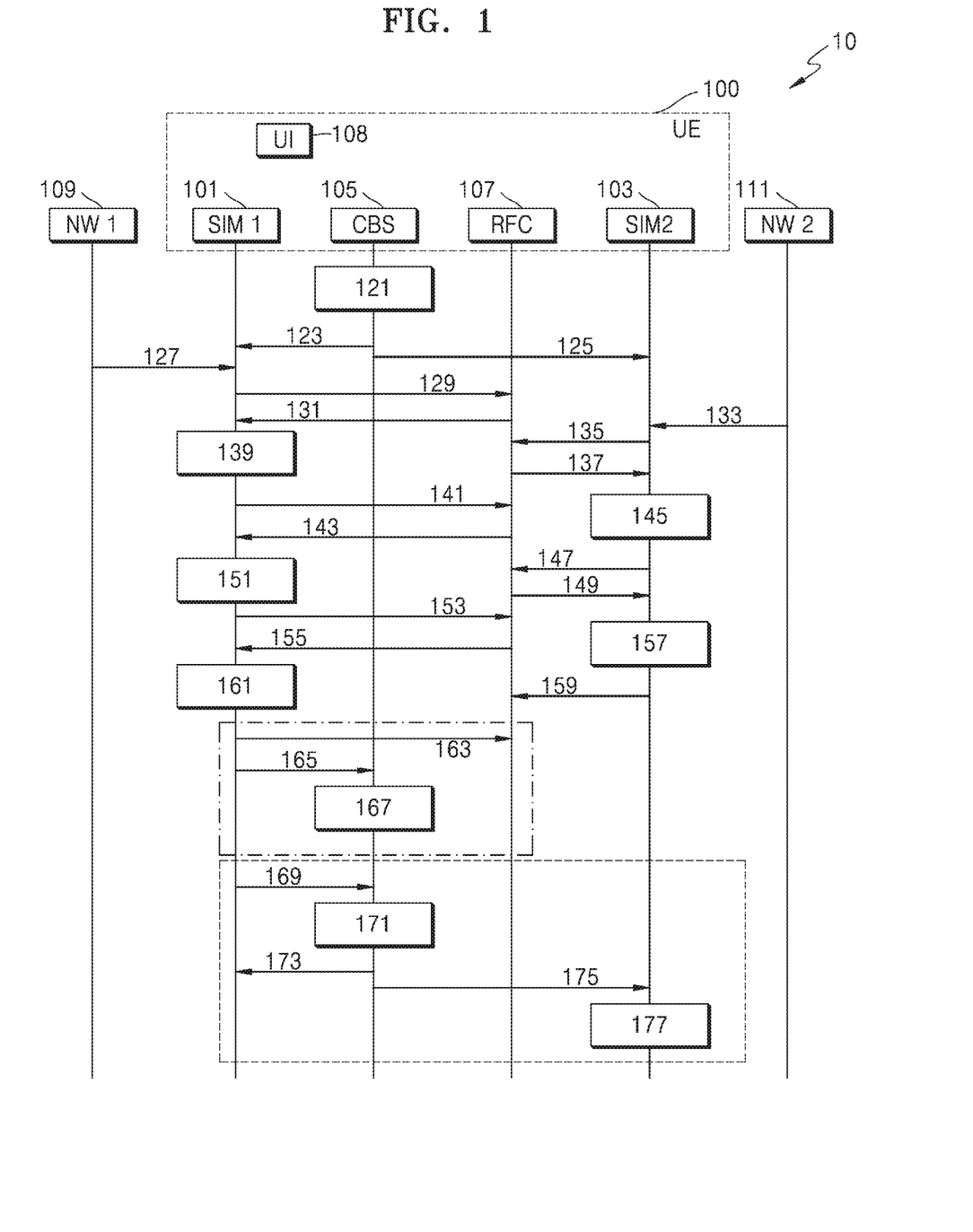
FIG. 1 illustrates a flow diagram for optimizing PWS message reception in a multi-SIM multi-standby UE in accordance with an embodiment of the present disclosure.

FIG. 1 schematically illustrates a flow diagram of a method, 10, for optimizing PWS message reception in a multi-SIM multi-standby UE 100 in accordance with an embodiment of the present disclosure. As shown in FIG. 1A, the UE 100 used in method 10 may include multiple SIMs ("multi-SIM"), e.g., a first SIM 101 (interchangeably, "SIM 1" or "stack 1") and a second SIM 103 ("SIM 2" or "stack 2"). The UE 100 may further include a CBS controller ("CBS circuitry" of "CBS control unit") 105 an RF chain ("RFC") 107, and a user interface (UI) 108. The UE 100 may communicate in a network environment including a first network entity 109 ("NW 1") and a second network entity 111 ("NW 2"). In method 10, each SIM of the UE 100 may be communicatively connected to (or "associated with") a different network operator or a different network entity, e.g., each SIM card of the UE 100 may be associated with a different network operator. For instance, the first SIM 101 may be associated with the first network entity 109 and the second SIM 101 may be associated with the second network entity 111 as shown in FIG. 1.

The CBS controller 105 and the RF chain 107 may be common to, and shared by, the first SIM 101 and the second SIM 103. The RF chain 107 may be a cascade of electronic components such as mixers, filters, amplifiers, attenuators, a modem, a processor, memory, and the like. The CBS controller 105 may control the PWS message reception efficiently by configuring the individual stacks with proper PWS message identifiers so as to minimize RFC conflicts during PWS message reception. The CBS controller 105 may ensure low latency reception of a PWS message even when the PWS message is broadcast in segments.

In operation 121, prior to receiving scheduling information from the first network entity 109 and/or the second network entity 111, the CBS controller 105 may determine whether the first SIM 101 implements a DDS protocol stack; if so, the CBS controller 105 may configure the first SIM 101 as a primary SIM. Additionally, the CBS controller 105 may generate a primary CBS configuration list for use by the first SIM 101. This primary list may include common PWS message identifiers between the first SIM 101 and the second SIM 103 along with the PWS message identifiers supported only by the first SIM 101. The CBS controller 105 may also generate, for use by the second SIM 103, a secondary CBS configuration list with PWS message identifiers supported only by the second SIM 103.

In operation 123, the CBS controller 105 may send the primary CBS configuration list to the first SIM 101. In operation 125, the CBS controller 105 may send the secondary CBS configuration list to the second SIM 103. At this stage, the first SIM 101 is designated as a primary SIM and the second SIM 103 is designated as a secondary SIM. The operations 121 to 125 refer to operations in the UE 100 prior to receiving scheduling information.

In operation 127, the first SIM 101 may receive broadcast information notifying it about PWS message reception, from the first network entity 109. (Note that in the various operations herein, information received by first SIM 101 and second SIM 103 from any network entity is derived from signals received by RFC 107, and then routed from RFC 107 to the respective SIM 101 or 103.) This operation may also be referred as a paging cycle. The PWS message may be of 2 types: (1) Earthquake and Tsunami Warning System (ETWS) and (2) Commercial Mobile Alert System (CMAS). In Long-Term Evolution (LTE), ETWS is broadcast in SIB10 (primary) and SIB11 (secondary) and CMAS is broadcast in SIB12. The scheduling information of SIB10, SIB11 and SIB12 is broadcast in SIB1. The scheduling information of SIB10, SIB11 and SIB12 is not broadcast every time in SIB1 by a given network (e.g., NW 1 109). To notify UE 100 about the scheduling information, the first network entity 109 starts broadcasting a paging message with cause ETWS/CMAS. When the UE 100 decodes this paging information then the UE 100 reads SIB1 again to find the relevant scheduling information of SIBs containing a PWS message.

In operation 129, the first SIM 101 may send a SIB read request for SIB1 to the RF chain 107 and at operation 131, the RF chain 107 may send a SIB read response to the first SIM 101 in response to the SIB read request. In detail, SIBs are being broadcast by a network. Therefore, SIB read procedure is used by Access Stratum (AS) layer to notify the lower layers which SIB information is required by the AS layer. For example, in this case, the AS layer wants the SIB1 information to obtain the scheduling information of PWS related SIBs (SIB10/SIB11/SIB12). In SIB read response, the lower layer, after fetching the requested SIB from the network broadcast, will send the information to AS layer.

In operation 133, the second SIM 103 may receive the broadcast information notifying it about PWS message reception from the second network entity 111. This operation may also be referred as a paging cycle. SIBs containing PWS message information is broadcast by both the networks, i.e., the first network entity 109 and the second network entity 111, simultaneously. Since the UE 100 has a single RF chain 107, only one SIM, i.e., the first SIM 101 or the second SIM 103, may receive data from the RF chain 107 at a time. Thus, the UE 100 decodes the broadcast from one of the networks, i.e., the first network entity 109 or the second network entity 111 at a time.

In operation 135, the second SIM 101 may send a SIB read request for SIB1 to the RF chain 107 and at operation 137, the RF chain 107 may send a SIB read response to the second SIM 103 in response to the SIB read request. At operation 139, the first SIM 101 may find/determine the scheduling information of SIBs containing a PWS message in the broadcast information received from the first network entity 109. The operation 139 may be performed in parallel when the operations 135 and 137 are performed.

In operation 141, the first SIM 101 may send a SIB read request to the RF chain 107 for SIB containing a PWS message and at operation 143, the RF chain 107 may send a SIB read response to the first SIM 101 in response to the SIB read request.

In operation 145, the second SIM 103 may find/determine the scheduling information of SIBs containing a PWS message in the broadcast information received from the second network entity 111. The operation 145 may be performed in parallel when the operations 141 and 143 are performed.

In operation 147, the second SIM 103 may send a SIB read request to the RF chain 107 for SIB containing the PWS message and at operation 149, the RF chain 107 may send a SIB read response to the second SIM 103 in response to the SIB read request.

In operation 151, the first SIM 101 may check whether a PWS message identifier associated with the PWS message is present in a primary CBS configuration list of the first SIM 101 and may receive the SIBs based on the scheduling information when the PWS message identifier associated with the PWS message is present in the primary CBS configuration list of the first SIM 101. The operation 151 may be performed in parallel when the operations 147 and 149 are performed.

In operation 153, the first SIM 101 may send a SIB read request to the RF chain 107 and in operation 155, the RF chain 107 may send a SIB read response to the first SIM 101 in response to the SIB read request.

In operation 157, the second SIM of the UE may check whether the PWS message identifier associated with the PWS message is present in a secondary CBS configuration list of the second SIM 103 and may terminate reception of the SIBs based on the scheduling information when the PWS message identifier associated with the PWS message is absent in the secondary CBS configuration list of the second SIM 103. The operation 157 may be performed in parallel when the operations 153 and 155 are performed.

In operation 159, the second SIM 103 may send a SIB read stop message to the RF chain 107. In operation 161, the first SIM 101 may determine whether there is an error, such as an error correction code (ECC) error, while receiving the PWS message from the SIBs. (If an error exists, it may be desirable to switch reception operations from the first SIM 101 to the second SIM 103. These operations are explained below.)

In operation 163, the first SIM 103 may send a SIB read stop message to the RF chain 107 when all the segments of PWS message are received. Thereafter, at operation 165, the first SIM 101 may send a CBS notification containing the PWS message to the CBS controller 105 when there is no error while receiving the PWS message from the SIBs. In one embodiment, at operation 167, the CBS controller 105 may send the PWS message to the user interface 108 for displaying the PWS message to a user. In another embodiment, at operation 167, the CBS controller 105 may send the PWS message to the user interface 108 for displaying the PWS message to a user, where the PWS message includes a selectable URL. Thereafter, the UE 100 may determine whether a webpage associated with the URL is loaded on the user interface 108 when the user accesses (selects) the URL (e.g., by touch selection on a touch screen of the user interface) and may notify the user to switch mobile data to the second SIM 103 when the webpage associated with the URL is not loaded on the user interface 108. The operations 163 to 167 refer to operations in the UE 100 when there is no error while receiving the PWS message from the SIBs by the first SIM 101.

In operation 169, the first SIM 101 may send an error message to the CBS controller 105 when there is error while receiving the PWS message from the SIBs. Thereafter, in operation 171, the CBS controller 105 may regenerate the primary CBS configuration list with common PWS message identifiers between the first SIM 101 and the second SIM 103 along with the PWS message identifiers supported only by the second SIM 103 for the second SIM 103 100. Subsequently, the CBS controller 105 may regenerate the secondary CBS configuration list for the first SIM 101 with PWS message identifiers supported only by the first SIM 101.

In operation 173, the CBS controller 105 may send the regenerated secondary CBS configuration list to the first SIM 101 of the UE 100. At operation 175, the CBS controller 105 may send the regenerated primary CBS configuration list to the second SIM 103 of the UE 100. At this stage, the first SIM 101 may be the secondary SIM and the second SIM 103 may be the primary SIM after reconfiguration by the CBS controller 105 of the UE 100.

In operation 177, the second SIM 103 regenerated as the primary SIM may continue to receive the scheduling information of SIBs containing the PWS message. When there is no error while receiving the PWS message from the SIBs by the second SIM 103 of the UE 100, the second SIM 103 may send a CBS notification containing the PWS message to the CBS controller 105. In one embodiment, the CBS controller 105 may send the PWS message to the user interface 108 for displaying the PWS message to a user. In another embodiment, the CBS controller 105 may send the PWS message to the user interface 108 for displaying the PWS message to a user, where the PWS message comprises a URL. Thereafter, the UE 100 may determine whether a webpage associated with the URL is loaded on the user interface 108 when the user accesses the URL and may notify the user to switch mobile data to the first SIM 101 when the webpage associated with the URL is not loaded on the user interface 108.

Figure 2:
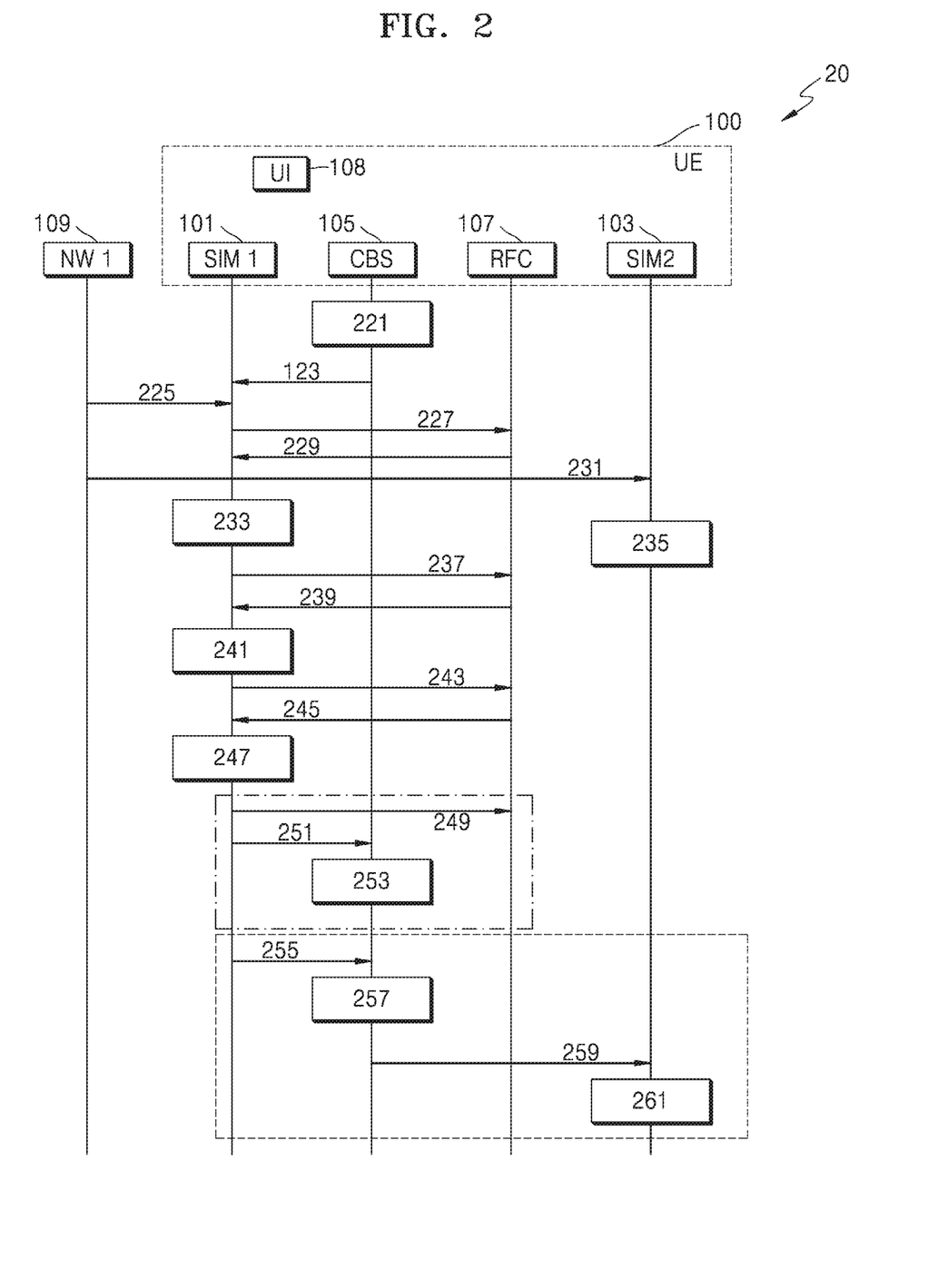
FIG. 2 illustrates a flow diagram for optimizing PWS message reception in a multi-SIM multi-standby UE in accordance with another embodiment of the present disclosure.

FIG. 2 is a flow diagram illustrating a method, 20, for optimizing PWS message reception in a multi-SIM multi-standby UE in accordance with another embodiment of the present disclosure. In method 20, the UE 100 communicates with the first network entity 109 but may not communicate with the second network entity 111 (which is omitted from FIG. 2). The UE 100 of FIG. 2, configured to implement method 20, may include the CBS controller 105, the RF chain 107, the first SIM 101, the second SIM 103 and the UI 108, which may have the same general functionality as described above for FIG. 1, but modified to perform the operations of method 20 described hereafter.

In this embodiment, each SIM of the UE 100 may be communicatively connected to (or associated with) a same network operator or a same network entity, e.g., each SIM card of the UE 100 belongs to same network operator. For instance, the first SIM 101 and the second SIM 103 may be associated with the first network entity 109 as shown in FIG. 2.

The operations for optimizing PWS message reception in the UE 100 in accordance with method 20 are as follows: In operation 221, prior to receiving scheduling information from the first network entity 109, the CBS controller 105 may determine whether the first SIM 101 implements a DDS protocol stack. If so, the CBS controller 105 may designate and configure the first SIM 101 as a primary SIM. The CBS controller 105 may also generate, for the first SIM 101, a primary CBS configuration list. This list may have common PWS message identifiers between the first SIM 101 and the second SIM 103 along with the PWS message identifiers supported only by the first SIM 101.

In operation 223, the CBS controller 105 may send the CBS configuration list to the first SIM 101. At this stage, the first SIM 101 is designated a primary SIM and the second SIM 103 is designated a secondary SIM. The operations 221 to 223 refer to operations in the UE 100 prior to receiving scheduling information.

In operation 225, the first SIM 101 may receive a broadcast information notifying about PWS message reception from the first network entity 109. This operation may also be referred as a paging cycle. The PWS message may be of 2 types: (1) Earthquake and Tsunami Warning System (ETWS) and (2) Commercial Mobile Alert System (CMAS). In Long-Term Evolution (LTE), ETWS is broadcast in SIB10 (primary) and SIB11 (secondary) and CMAS is broadcast in SIB12. The scheduling information of SIB10, SIB11 and SIB12 is broadcast in SIB1. The scheduling information of SIB10, SIB11 and SIB12 is not broadcast every time in SIB1 by a network. To notify UE 100 about the scheduling information, the network starts broadcasting paging message with cause ETWS/CMAS. When the UE 100 decodes this paging information then the UE 100 reads SIB1 again to find the relevant scheduling information of SIBs containing PWS message.

In operation 227, the first SIM 101 may send a SIB read request to the RF chain 107 and at operation 229, the RF chain 107 may send a SIB read response to the first SIM 101 in response to the SIB read request. In detail, SIBs are being broadcast by a network. So, SIB read procedure is used by Access Stratum (AS) layer to notify the lower layers which SIB information is required by the AS layer. For example, in this case, the AS layer wants the SIB1 information to obtain the scheduling information of PWS related SIBs (SIB10/SIB11/SIB12). In SIB read response, the lower layer after fetching the requested SIB from the network broadcast will send the information to AS layer In operation 231, the second SIM 103 may receive broadcast information notifying about PWS message reception from the first network entity 109. This operation may also be referred as a paging cycle. SIBs containing PWS message information is broadcast by the network i.e., the first network entity 109. Since the UE 100 comprises a single RF chain 107, only one SIM i.e., the first SIM 101 or the second SIM 103 tune to RF at a time.

In operation 233, the first SIM 101 may find/determine the scheduling information of SIB s containing a PWS message in the broadcast information received from the first network entity 109. At operation 235, the second SIM 103 may check whether a CBS configuration list is present in the second SIM 103 and may terminate reception of the SIBs when the CBS configuration list is absent in the second SIM 103.

In operation 237, the first SIM 101 of the UE 100 may send a SIB read request to the RF chain 107 and at operation 239, the RF chain 107 may send a SIB read response to the first SIM 101 in response to the SIB read request. At operation 241, the first SIM 101 may receive the SIB s based on the scheduling information when the PWS message identifier associated with the PWS message is present in the CBS configuration list of the first SIM 101. At operation 243, the first SIM 101 may send a SIB read request to the RF chain 107 and at operation 245, the RF chain 107 may send a SIB read response to the first SIM 101 in response to the SIB read request. At operation 247, the first SIM 101 may determine whether there is an error while receiving the PWS message from the SIBs.

In operation 249, the first SIM 103 may send a SIB read stop message to the RF chain 107 after receiving all the segments of PWS message. Thereafter, at operation 251, the first SIM 101 may send a CBS notification containing the PWS message to the CBS controller 105 when there is no error while receiving the PWS message from the SIBs. In one embodiment, at operation 253, the CBS controller 105 may send the PWS message to the user interface 108 for displaying the PWS message to a user. In another embodiment, at operation 253, the CBS controller 105 may send the PWS message to the user interface 108 for displaying the PWS message to a user, wherein the PWS message may comprises a URL. Thereafter, the UE 100 may determine whether a webpage associated with the URL is loaded on the user interface 108 when the user accesses the URL and may notify the user to switch mobile data to the second SIM 103 when the webpage associated with the URL is not loaded on the user interface 108. The operations 249 to 253 refer to operations in the UE 100 when there is no error while receiving the PWS message from the SIBs by the first SIM 101.

In operation 255, the first SIM 103 may send an error message to the CBS controller 105 when there is error while receiving the PWS message from the SIB s. Thereafter, at operation 257, the CBS controller 105 may regenerate the CBS configuration list with common PWS message identifiers between the first SIM 101 and the second SIM 103 along with the PWS message identifiers supported only by the second SIM 103 for the second SIM 103 of the UE 100. At operation 259, the CBS controller 105 may send the regenerated CBS configuration list to the second SIM 103 of the UE 100. At this stage, the first SIM 101 may be the secondary SIM and the second SIM 103 may be the primary SIM after reconfiguration by the CBS controller 105 of the UE 100. At operation 261, the second SIM 103 reconfigured as the primary SIM may continue to receive the scheduling information of SIB s containing the PWS message. When there is no error while receiving the PWS message from the SIBs by the second SIM 103, the second SIM 103 may send a CBS notification containing the PWS message to the CBS controller 105 (not shown in FIG. 1). In one embodiment, the CBS controller 105 may send the PWS message to the user interface 108 for displaying the PWS message to a user. In another embodiment, the CBS controller 105 may send the PWS message to the user interface 108 for displaying the PWS message to a user, where the PWS message comprises a URL. Thereafter, the UE 100 may determine whether a webpage associated with the URL is loaded on the user interface 108 when the user accesses the URL and may notify the user to switch mobile data to the first SIM 101 when the webpage associated with the URL is not loaded on the user interface 108.

Figure 3:
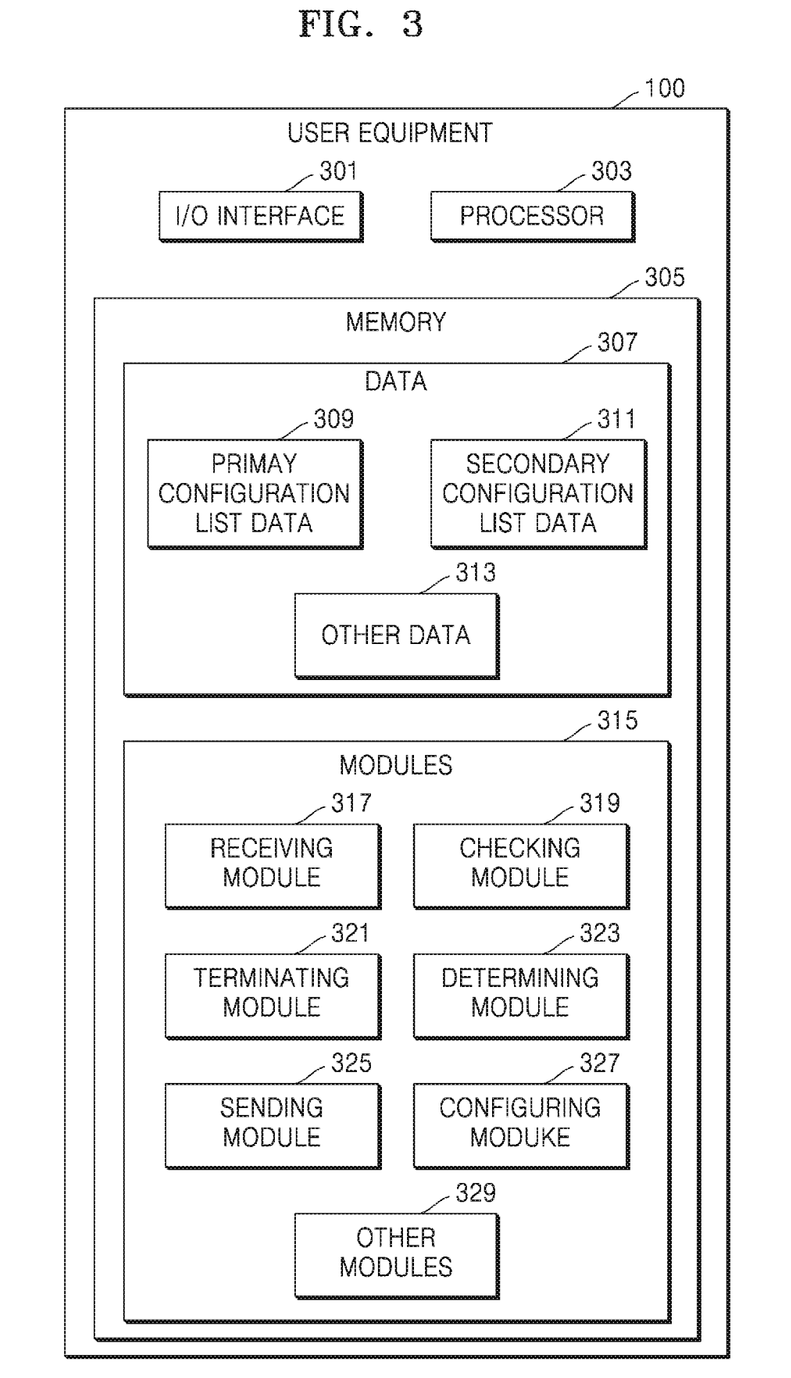
FIG. 3 shows a detailed block diagram of a UE in accordance with some embodiments of the present disclosure.

FIG. 3 shows a detailed block diagram of a UE in accordance with some embodiments of the present disclosure.

In addition to the first SIM 101, the second SIM 103 and the CBS controller 105 as shown in FIGS. 1 and 2, the UE 100 may include I/O interface 301, processor 303, data 307 and one or more modules 315, which are described herein in detail. The I/O interface 301, the processor 303, the data 307 and the one or more modules 315 may be common to the first SIM 101, the second SIM 103 and the CBS controller 105 and shared by the first SIM 101, the second SIM 103 and the CBS controller 105.

The UE 301 may communicate with one or more network entities i.e., the first network entity 109 and second network entity 111 via the I/O interface 301. The I/O interface 301 may employ communication protocols/methods such as, without limitation, Bluetooth, cellular e.g., CDMA, HSPA+, GSM, LTE, NR, WiMax, or the like.

The processor 303 may include at least one data processor for optimizing PWS message reception in a multi-SIM multi-standby UE 100. The processor 303 may include specialized processing units such as, without limitation, integrated system (bus) controllers, memory management control units, floating point units, graphics processing units, digital signal processing units, etc.

In one embodiment, the data 307 may be stored within the memory 305. The memory 305 may be communicatively coupled to the processor 303 of the UE 100. The memory 305 may, also, store processor instructions which may cause the processor 303 to execute the instructions for optimizing PWS message reception in a multi-SIM multi-standby UE 100. The memory 305 may include, without limitation, memory drives, etc. The memory drives may further include a drum, magnetic disc drive, magneto-optical drive, optical drive, RAID, solid-state memory devices, solid-state drives, etc.

The data 307 may include, for example, a primary configuration list 309, a secondary configuration list 311 and other data 313.

The primary configuration list data 309 may store a primary CBS configuration list. The secondary configuration list data 311 may store a secondary CBS configuration list.

In method 10, prior to the first SIM 101 receiving a scheduling information of SIBs containing a PWS message from the first network entity 109 and the second SIM 103 receiving the scheduling information of SIBs containing the PWS message from the second network entity 111, the primary CBS configuration list data 309 for the first SIM 101 may comprise common PWS message identifiers between the first SIM 101 and the second SIM 103 along with the PWS message identifiers supported only by the first SIM 101. The secondary CBS configuration list data 311 for the second SIM 103 may comprise PWS message identifiers supported only by the second SIM 103. When an error exists while the first SIM 101 receives the PWS message from the SIBs, the first SIM 101 and second SIM 103 may switch roles as follows: the primary CBS configuration list data 309 may be regenerated by the CBS controller 105 for the second SIM 103 to store common PWS message identifiers between first SIM 101 and the second SIM 103 along with the PWS message identifiers supported only by the second SIM 103. Further, the secondary CBS configuration list data 311 may be regenerated by the CBS controller 105 for use by the first SIM 101 to store PWS message identifiers supported only by the first SIM 101.

In method 20, prior to the first SIM 101 and the second SIM 103 receiving a scheduling information of SIBs containing a PWS message from the network entity 109, the primary CBS configuration list data 309 may comprise common PWS message identifiers between the first SIM 101 and the second SIM 103 along with the PWS message identifiers supported only by the first SIM 101 for the first SIM 101 of the UE 100. In this case, the secondary CBS configuration list data 311 may not be used. Briefly, when both the SIMs i.e., the first SIM 101 and the second SIM 103 belong to same operator or network, in that case there is no need of secondary CBS configuration list as both the SIMs support the same PWS message identifiers. When an error exists while receiving the PWS message from the SIBs, the primary CBS configuration list data 309 may be regenerated by the CBS controller 105 for the second SIM 103, to store common PWS message identifiers between the first SIM 101 and the second SIM 103 along with the PWS message identifiers supported only by the second SIM 103.

The other data 313 may store data, including temporary data and temporary files, generated by one or more modules 315 for performing the various functions of the UE 100.

In one embodiment, the data 307 in the memory 305 are processed by the one or more modules 315 present within the memory 305 of the UE 100. The one or more modules 315 may be implemented as dedicated hardware units. As used herein, the term module refers to an ASIC, an electronic circuit, a FPGA, a combinational logic circuit, and/or other suitable components that provide the described functionality. In some implementations, the one or more modules 315 may be communicatively coupled to the processor 303 for performing one or more functions of the UE 100. The one or more modules 315 when configured with the functionality defined in the present disclosure will result in a novel hardware.

In various implementations, the one or more modules 315 may include, but are not limited to, a receiving module 317, a checking module 319, a terminating module 321, a determining module 323, a sending module 325 and a configuring module 327. The one or more modules 315 may, also, include other modules 329 to perform various miscellaneous functionalities of the UE 100.

Receiving module 317 functionality may be as follows:

In method 10, the receiving module 317 may receive scheduling information of SIBs containing a PWS message in a broadcast information from the first network entity 109 and the scheduling information of SIBs containing the PWS message in the broadcast information from the second network entity 111. The receiving module 317 may receive the SIBs based on the scheduling information when the PWS message identifier associated with the PWS message is present in the primary CBS configuration list of the first SIM 101.

In method 20, the receiving module 317 may receive a scheduling information of SIBs containing PWS message in a broadcast information from a network entity 109. The receiving module 317 may receive the SIBs based on the scheduling information when the PWS message identifier associated with the PWS message is present in the CBS configuration list of the first SIM 101.

Checking module 319 functionality may be as follows:

In method 10, the checking module 319 may check whether a PWS message identifier associated with the PWS message is present in a primary CBS configuration list of the first SIM 101. The checking module 319 may check whether the PWS message identifier associated with the PWS message is present in a secondary CBS configuration list of the second SIM 103.

In method 20, the checking module 319 may check whether a CBS configuration list is present in the second SIM 103.

Terminating module 321 functionality may be as follows:

In method 10, the terminating module 321 may terminate reception of the SIBs by the second SIM 103 (when the second SIM 103 is designated as the secondary SIM) based on the scheduling information when the PWS message identifier associated with the PWS message is absent in the secondary CBS configuration list of the second SIM 103. (The same functionality may apply to the first SIM 101 when it is designated the secondary SIM.)

In method 20, the terminating module 321 may terminate reception of the SIBs by the second SIM 103 (when the second SIM 103 is designated the secondary SIM) when the CBS configuration list is absent in the second SIM 103. (The same functionality may apply to the first SIM 101 when it is designated the secondary SIM.)

Determining module 323 functionality may be as follows:

In method 10, the determining module 323 may determine whether there is an error while receiving the PWS message from the SIBs. The determining module 323 may determine whether the first SIM 101 implements a DDS protocol stack. The determining module 323 may determine whether a webpage associated with a URL of a PWS message is loaded on the user interface 108 when a user accesses the URL.

In method 20, the determining module 323 may determine whether an error exists while receiving the PWS message from the SIBs. The determining module 323 may determine whether the first SIM 101 is a DDS protocol stack. The determining module 323 may determine whether a webpage associated with the URL is loaded on the user interface 108 when a user accesses the URL.

Sending module 325 functionality may be as follows:

In method 10, the sending module 325 may send a CBS notification containing the PWS message to the CBS controller 105, when there is no error while receiving the PWS message from the SIBs. The sending module 325 may send the primary CBS configuration list to the first SIM 101 and may send the secondary CBS configuration list to the second SIM 103 of the UE 100. The sending module 325 may send the PWS message to the user interface 108 for displaying the PWS message. The sending module 325 may send the PWS message to the user interface 108 for displaying the PWS message, wherein the PWS message comprises a URL. The sending module 325 may, also, notify the user to switch mobile data to the second SIM 103 when the webpage associated with the URL is not loaded on the user interface 108. The sending module 325 may send an error message to the CBS controller 105 when there is error while receiving the PWS message from the SIBs. The sending module 325 may send the regenerated primary CBS configuration list to the second SIM 103 and may send the regenerated secondary CBS configuration list to the first SIM 101.

In method 20, the sending module 325 may send a CBS notification containing the PWS message to the CBS controller 105 of the UE 100, when there is no error while receiving the PWS message from the SIBs. The sending module 325 may send the CBS configuration list to the first SIM 101. The sending module 325 may send the PWS message to the user interface 108 for displaying the PWS message. The sending module 325 may send the PWS message to the user interface 108 for displaying the PWS message, wherein the PWS message comprises a URL. The sending module 325 may, also, notify the user to switch mobile data to the second SIM 103 when the webpage associated with the URL is not loaded on the user interface 108. The sending module 325 may send an error message to the CBS controller 105 when there is error while receiving the PWS message from the SIBs. The sending module 325 may send the regenerated CBS configuration list to the second SIM 103.

Configuring module 327 functionality may be as follows:

In method 10, the configuring module 327 may configure the first SIM 101 as a primary SIM when the first SIM 101 is the DDS protocol stack. The configuring module 327 may generate the primary CBS configuration list with common PWS message identifiers between the first SIM 101 and the second SIM 103 along with the PWS message identifiers supported only by the first SIM 101 for the first SIM 103 and may generate the secondary CBS configuration list with PWS message identifiers supported only by the second SIM 103 for the second SIM 103 of the UE 100. The configuring module 327 may regenerate the primary CBS configuration list with common PWS message identifiers between first SIM 101 and second SIM 103 along with the PWS message identifiers supported only by the second SIM 103 for the second SIM 103 and may regenerate the secondary CBS configuration list with PWS message identifiers supported only by the first SIM 101 for the first SIM 101 of the UE 100.

In method 20, the configuring module 327 may configure the first SIM 101 as a primary SIM when the first SIM 101 is the DDS protocol stack. The configuring module 327 may generate the CBS configuration list with common PWS message identifiers between the first SIM 101 and the second SIM 103 along with the PWS message identifiers supported only by the first SIM 101 for the first SIM 103. The configuring module 327 may regenerate the CBS configuration list with common PWS message identifiers between first SIM 101 and second SIM 103 along with the PWS message identifiers supported only by the second SIM 103 for the second SIM 103.

Figure 4:
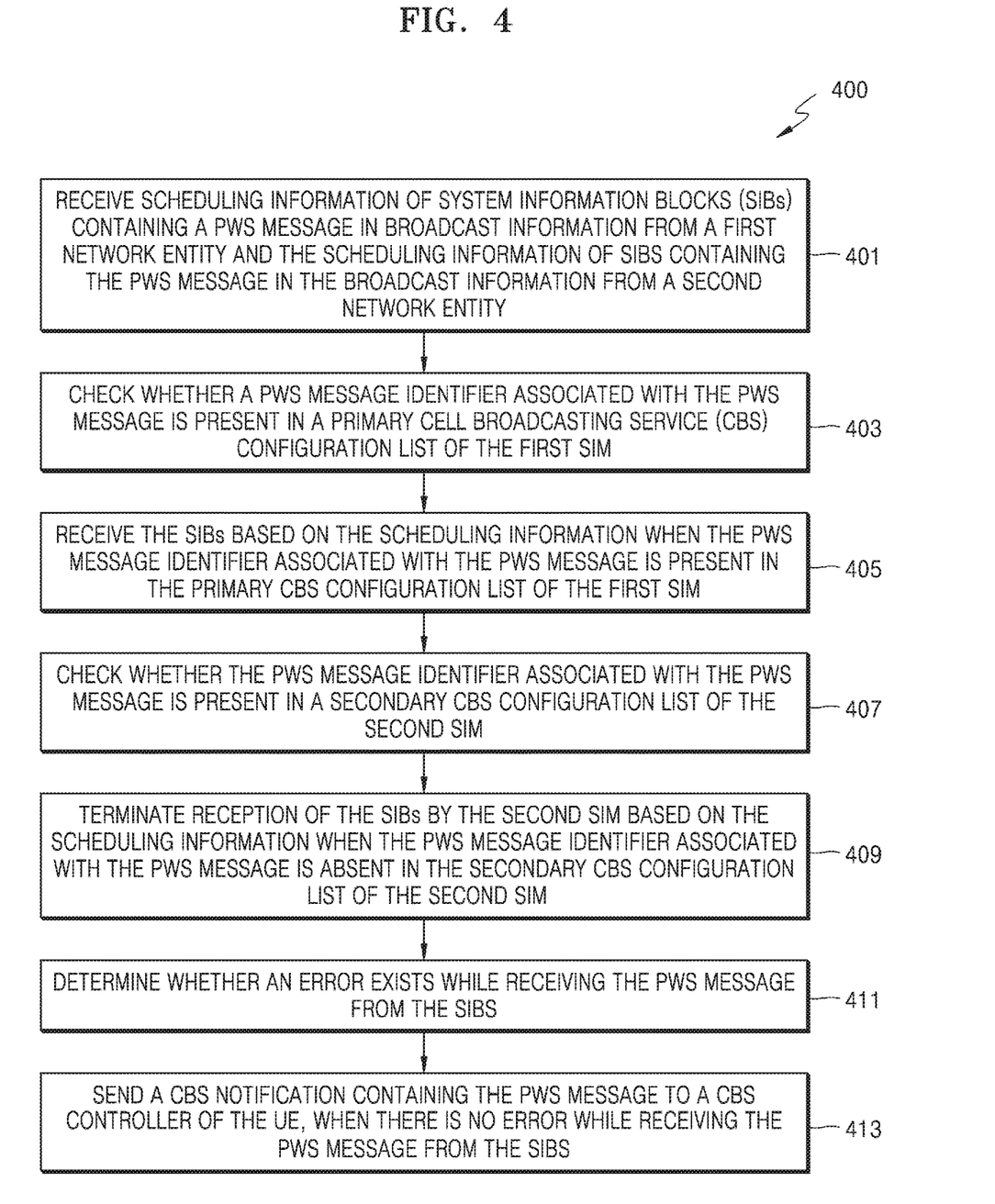
FIG. 4 illustrates a flowchart showing a method for optimizing PWS message reception in a multi-SIM multi-standby UE in accordance with an embodiment of the present disclosure.

FIG. 4 illustrates a flowchart showing a method for optimizing PWS message reception in a multi-SIM multi-standby UE in accordance with an embodiment of the present disclosure.

As illustrated in FIG. 4, the method 400 includes one or more blocks for optimizing PWS message reception in a multi-SIM multi-standby UE in accordance with the embodiment of the present disclosure. The method 400 may be described in the general context of computer executable instructions. Generally, computer executable instructions can include routines, programs, objects, components, data structures, procedures, modules, and functions, which perform particular functions or implement particular abstract data types.

At block 401, the first SIM 101 may receive a scheduling information of SIBs containing a PWS message in a broadcast information from a first network entity 109 and the second SIM 103 may receive the scheduling information of SIBs containing the PWS message in the broadcast information from a second network entity 111.

The first SIM 101 is a primary SIM and the second SIM 103 is a secondary SIM. The first SIM 101 and the second SIM 103 are associated with different network operators i.e., the first network entity 109 and the second network entity 111.

Prior to receiving the scheduling information, the CBS controller 105 may determine whether the first SIM 101 is a DDS protocol stack. Thereafter, the CBS controller 105 may configure the first SIM 101 as a primary SIM when the first SIM 101 is the DDS protocol stack and may generate the primary CBS configuration list with common PWS message identifiers between the first SIM 101 and the second SIM 103 along with the PWS message identifiers supported only by the first SIM 101 for the first SIM 101. Subsequently, the CBS controller 105 may generate the secondary CBS configuration list with PWS message identifiers supported only by the second SIM 103 for the second SIM 103.

The CBS controller 105 may send the primary CBS configuration list to the first SIM 101 and may send the secondary CBS configuration list to the second SIM 103.

At block 403, the first SIM 101 may check whether a PWS message identifier associated with the PWS message is present in a primary CBS configuration list of the first SIM 101.

At block 405, the first SIM 101 may receive the SIB s based on the scheduling information when the PWS message identifier associated with the PWS message is present in the primary CBS configuration list of the first SIM 101.

At block 407, the second SIM 103 may check whether the PWS message identifier associated with the PWS message is present in a secondary CBS configuration list of the second SIM 103.

At block 409, the second SIM 103 may terminate reception of the SIB s based on the scheduling information when the PWS message identifier associated with the PWS message is absent in the secondary CBS configuration list of the second SIM 103.

At block 411, the first SIM 101 may determine whether there is an error while receiving the PWS message from the SIBs.

At block 413, when there is no error while receiving the PWS message from the SIBs, the first SIM 101 may send a CBS notification containing the PWS message to a CBS controller 105.

In one embodiment, the CBS controller 105 may send the PWS message to the user interface 108 for displaying the PWS message. In another embodiment, the CBS controller 105 may send the PWS message to the user interface 108 for displaying the PWS message, wherein the PWS message comprises a URL. Thereafter, the UE 100 may determine whether a webpage associated with the URL is loaded on the user interface 108 when a user accesses the URL and may notify the user to switch mobile data to the second SIM 103 when the webpage associated with the URL is not loaded on the user interface 108.

When there is an error while receiving the PWS message from the SIBs, the first SIM 101 may send an error message to the CBS controller 105. Thereafter, the CBS controller 105 may regenerate the primary CBS configuration list with common PWS message identifiers between the first SIM 101 and the second SIM 103 along with the PWS message identifiers supported only by the second SIM 103 for the second SIM 103 and may regenerate the secondary CBS configuration list with PWS message identifiers supported only by the first SIM 101 for the first SIM 101. Subsequently, the CBS controller 105 may send the regenerated primary CBS configuration list to the second SIM 103 and may send the regenerated secondary CBS configuration list to the first SIM 101. The first SIM 101 may be a secondary SIM and the second SIM 103 may be the primary SIM after reconfiguration by the CBS controller 105 of the UE 100.

Figure 5:
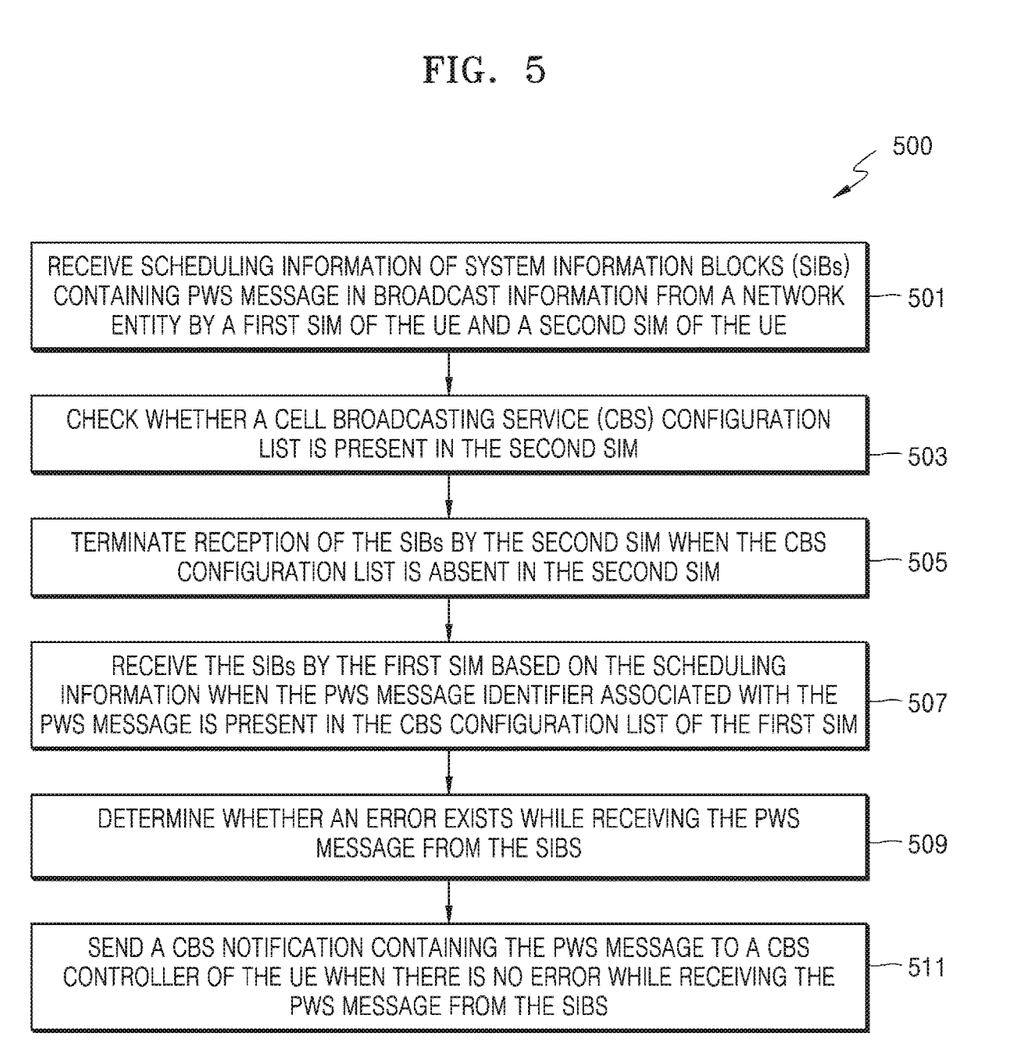
FIG. 5 illustrates a flowchart showing a method for optimizing PWS message reception in a multi-SIM multi-standby UE in accordance with another embodiment of the present disclosure.

FIG. 5 illustrates a flowchart showing a method for optimizing PWS message reception in a multi-SIM multi-standby UE in accordance with an embodiment of the present disclosure. As illustrated in FIG. 5, the method 500 includes one or more blocks for optimizing PWS message reception in a multi-SIM multi-standby UE in accordance the embodiment. The method 500 may be described in the general context of computer executable instructions. Generally, computer executable instructions can include routines, programs, objects, components, data structures, procedures, modules, and functions, which perform particular functions or implement particular abstract data types.

At block 501, the first SIM 101 and the second SIM 103 may receive a scheduling information of SIBs containing PWS message in a broadcast information from a network entity 109.

The first SIM 101 may be a primary SIM and the second SIM 103 may be a secondary SIM. The first SIM 101 and the second SIM 103 may be associated with same network operators i.e., the first network entity 109.

Prior to receiving the scheduling information, the CBS controller 105 may determine whether the first SIM 101 is a DDS protocol stack. Thereafter, the CBS controller 105 may configure the first SIM 101 as a primary SIM when the first SIM 101 is the DDS protocol stack and may generate the CBS configuration list with common PWS message identifiers between the first SIM 101 and the second SIM 103 along with the PWS message identifiers supported only by the first SIM 101 for the first SIM 101 of the UE 100. Subsequently, the CBS controller 105 may send the CBS configuration list to the first SIM 101.

At block 503, the second SIM 103 may check whether a CBS configuration list is present in the second SIM 103.

At block 505, the second SIM 103 may terminate reception of the SIBs when the CBS configuration list is absent in the second SIM 103.

At block 507, the first SIM 101 may receive the SIBs based on the scheduling information when the PWS message identifier associated with the PWS message is present in the CBS configuration list of the first SIM 101.

At block 509, the first SIM 101 may determine whether there is an error while receiving the PWS message from the SIBs, such as an error correction code (ECC) error.

At block 511, when there is no error while receiving the PWS message from the SIBs, the first SIM 101 may send a CBS notification containing the PWS message to a CBS controller 105 of the UE 100.

In an embodiment, the CBS controller 105 may send the PWS message to the user interface for displaying the PWS message. In another embodiment, the CBS controller 105 may send the PWS message to a user interface for displaying the PWS message, wherein the PWS message comprises a URL. Thereafter, the UE 100 may determine whether a webpage associated with the URL is loaded on the user interface when a user accesses the URL and may notify the user to switch mobile data to the second SIM 103 when the webpage associated with the URL is not loaded on the user interface 108.

When there is an error while receiving the PWS message from the SIBs, the first SIM 101 may send an error message to the CBS controller 105 of the UE 100. Thereafter, the CBS controller 105 may regenerate the CBS configuration list with common PWS message identifiers between the first SIM 101 and the second SIM 103 along with the PWS message identifiers supported only by the second SIM 103 for the second SIM 103 and may send the regenerated CBS configuration list to the second SIM 101 of the UE 100. The first SIM 101 may be a secondary SIM and the second SIM 103 may be the primary SIM after reconfiguration by the CBS controller 105 of the UE 100.

Technical advantages of various embodiments of the present disclosure may be as follows:

If the user is using the same operator SIM cards, e.g., the first SIM (e.g., primary SIM) and the second SIM (e.g., secondary SIM) are associated with the same network operator, CBS is configured on only the first SIM (i.e., primary SIM) as both the SIMs would be camping on the same cell.

If the user is using different operator SIM cards e.g., the first SIM (e.g., primary SIM) and the second SIM (e.g., secondary SIM) belong to different network operators, then based on the information received all the common message identifiers plus operator specific message identifiers for the first SIM are configured on the first SIM (e.g., primary SIM) and only the operator specific message identifiers for the second SIM are configured on the second SIM (e.g., secondary SIM).

The above solutions of various embodiments of the present disclosure minimize the RF chain sharing and conflicts between the multi-SIM (e.g., the primary SIM and the secondary SIM) receiving the PWS message. Consequently, the above solutions of the present disclosure improve data throughput and save battery power of the UE.

The CBS controller 105 of the UE 100 controls the PWS message reception efficiently by configuring the individual stacks with proper PWS message identifiers so as to minimize RF chain conflicts during PWS message reception. The CBS controller 105 ensures low latency reception of PWS message even if the PWS message is broadcast in segments.

During PWS message reception, a PWS message may contain a URL where a user can obtain critical information in detail at the time of emergency. But the SIM on which internet DDS is configured may be currently not in service (e.g. UE has moved out of service after reception of the PSW message) or mobile data is not working due to issues such as poor signal area, high interference and the like. This prevents the user from accessing critical PWS message. Embodiments of the present disclosure overcome this problem by notifying the user to switch the mobile data to the SIM which is in-service or has better network coverage so that the user can access critical information The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, PGA, ASIC, etc.).

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the inventive concept.

The illustrated operations of the various figures herein show certain events occurring in a certain order. In alternative embodiments, certain operations may be performed in a different order, modified or removed. Moreover, operations may be added to the above-described logic and still conform to the described embodiments. Further, operations described herein may occur sequentially or certain operations may be processed in parallel. Yet further, operations may be performed by a single processing unit or by distributed processing units.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for optimizing Public Warning System (PWS) message reception in a multi- Subscriber Identity Module (SIM) multi-standby User Equipment (UE) having a first SIM and a second SIM, the method comprising:
    receiving, by the first SIM, scheduling information of System Information Blocks (SIBs) containing a PWS message, in broadcast information from a first network entity;
    receiving, by the second SIM, the scheduling information of SIBs containing the PWS message in broadcast information from a second network entity;
    checking, by the first SIM, whether a PWS message identifier associated with the PWS message is present in a primary Cell Broadcasting Service (CBS) configuration list of the first SIM;
    receiving, by the first SIM, the SIBs based on the scheduling information when the PWS message identifier associated with the PWS message is present in the primary CBS configuration list of the first SIM;
    checking, by the second SIM, whether the PWS message identifier associated with the PWS message is present in a secondary CBS configuration list of the second SIM;
    terminating, by the second SIM, reception of the SIBs based on the scheduling information when the PWS message identifier associated with the PWS message is absent in the secondary CBS configuration list; and
    by the first SIM: determining, whether an error exists while receiving the PWS message from the SIBs, if not, sending a CBS notification containing the PWS message to a CBS controller of the UE.

2. The method as claimed in claim 1, wherein the first SIM is designated a primary SIM and the second SIM is designated a secondary SIM.

3. The method as claimed in claim 1, wherein the first SIM and the second SIM are associated with different network operators.

4. The method as claimed in claim 1, wherein prior to receiving the scheduling information, the method comprising:
    determining, by the CBS controller, whether the first SIM implements a Data Distribution Service (DDS) protocol stack;
    configuring, by the CBS controller of the UE, the first SIM as a primary SIM when the first SIM implements the DDS protocol stack;
    generating, by the CBS controller, the primary CBS configuration list with common PWS message identifiers between the first SIM and the second SIM along with the PWS message identifiers supported only by the first SIM, for the first SIM; and
    generating, by the CBS controller, the secondary CBS configuration list with PWS message identifiers supported only by the second SIM, for the second SIM.

5. The method as claimed in claim 4, further comprising:
    sending, by the CBS controller, the primary CBS configuration list to the first SIM; and
    sending, by the CBS controller, the secondary CBS configuration list to the second SIM.

6. The method as claimed in claim 1, further comprising:
    sending, by the CBS controller, the PWS message to a user interface of the UE for displaying the PWS message.

7. The method as claimed in claim 1, further comprising:
    sending, by the CBS controller, the PWS message to a user interface of the UE for displaying the PWS message, wherein the PWS message comprises a Uniform Resource Locator (URL);
    determining, by the UE, whether a webpage associated with the URL is loaded on the user interface when a user accesses the URL; and
    notifying, by the UE, the user to switch mobile data to the second SIM when the webpage associated with the URL is not loaded on the user interface.

8. The method as claimed in claim 1, further comprising:
    sending, by the first SIM, an error message to the CBS controller when the error exists while receiving the PWS message from the SIBs;
    regenerating, by the CBS controller, the primary CBS configuration list with common PWS message identifiers between the first and second SIMs along with the PWS message identifiers supported only by the second SIM, for the second SIM;
    regenerating, by the CBS controller, the secondary CBS configuration list with PWS message identifiers supported only by the first SIM, for the first SIM;
    sending, by the CBS controller, the reconfigured primary CBS configuration list to the second SIM; and
    sending, by the CBS controller, the reconfigured secondary CBS configuration list to the first SIM.

9. The method as claimed in claim 8, wherein the first SIM is designated a secondary SIM and the second SIM is designated a primary SIM after reconfiguration by the CBS controller.

10. A method for optimizing Public Warning System (PWS) message reception in a multi- Subscriber Identity Module (SIM) multi-standby User Equipment (UE) having a first SIM and a second SIM, the method comprising:
    receiving, by the first SIM and the second SIM, scheduling information of System Information Blocks (SIBs) containing a PWS message in broadcast information from a network entity;

checking, by the second SIM, whether a Cell Broadcasting Service (CBS) configuration list is present in the second SIM;

terminating, by the second SIM, reception of the SIBs when the CBS configuration list is absent in the second SIM;

receiving, by the first SIM, the SIBs based on the scheduling information when a PWS message identifier associated with the PWS message is present in a CBS configuration list of the first SIM; and by the first SIM: determining, whether an error exists while receiving the PWS message from the SIBs, if not, sending, a CBS notification containing the PWS message to a CBS controller of the UE.

11. The method as claimed in claim 10, wherein the first SIM is designated a primary SIM and the second SIM is designated a secondary SIM.

12. The method as claimed in claim 10, wherein the first SIM and the second SIM are associated with the same network operator.

13. The method as claimed in claim 10, wherein prior to receiving the scheduling information, the method comprises:

determining, by the CBS controller, whether the first SIM implements a Data Distribution Service (DDS) protocol stack;

configuring, by the CBS controller, the first SIM as a primary SIM when the first SIM implements s the DDS protocol stack;

configuring, by the CBS controller, the CBS configuration list with common PWS message identifiers between the first and second SIMs along with the PWS message identifiers supported only by the first SIM, for the first SIM; and sending, by the CBS controller, the CBS configuration list to the first SIM.

14. The method as claimed in claim 10, further comprising:

sending, by the CBS controller, the PWS message to a user interface of the UE for displaying the PWS message.

15. The method as claimed in claim 10, further comprising:

sending, by the CBS controller, the PWS message to a user interface of the UE for displaying the PWS message, wherein the PWS message comprises a Uniform Resource Locator (URL);

determining, by the UE, whether a webpage associated with the URL is loaded on the user interface when a user accesses the URL; and notifying, by the UE, the user to switch mobile data to the second SIM when the webpage associated with the URL is not loaded on the user interface.

16. The method as claimed in claim 10, further comprising:

sending, by the first SIM, an error message to the CBS controller when the error is detected while receiving the PWS message from the SIBs;

regenerating, by the CBS controller of the UE, the CBS configuration list with common PWS message identifiers between the first and second SIMs along with the PWS message identifiers supported only by the second SIM, for the second SIM; and sending, by the CBS controller, the reconfigured CBS configuration list to the second SIM.

17. The method as claimed in claim 16, wherein the first SIM is designated a secondary SIM and the second SIM is designated the primary SIM after reconfiguration by the CBS controller.

18. A multi-Subscriber Identity Module (SIM) multi-standby User Equipment (UE) for optimizing Public Warning System (PWS) message reception, the UE comprising:

a first SIM and a second SIM;

a processor; and a memory communicatively coupled to the processor, wherein the memory stores processor-executable instructions, which on execution by the processor, cause the processor to control operations comprising:

receiving, by the first SIM, scheduling information of System Information Blocks (SIBs) containing a PWS message, in broadcast information from a first network entity, and receiving, by the second SIM, the scheduling information of SIBs containing the PWS message, in broadcast information from a second network entity;

checking whether a PWS message identifier associated with the PWS message is present in a primary Cell Broadcasting Service (CBS) configuration list of the first SIM;

receiving the SIBs based on the scheduling information when the PWS message identifier associated with the PWS message is present in the primary CBS configuration list of the first SIM;

checking whether the PWS message identifier associated with the PWS message is present in a secondary CBS configuration list of the second SIM;

terminating reception of the SIBs from the second network entity based on the scheduling information when the PWS message identifier associated with the PWS message is absent in the secondary CBS configuration list of the second SIM;

determining whether an error exists while receiving the PWS message from the SIBs; and sending a CBS notification containing the PWS message to a CBS controller of the UE when no error exists while receiving the PWS message from the SIBs.

19. The UE as claimed in claim 18, wherein the first SIM is designated a primary SIM and the second SIM is designated a secondary SIM.

20. The UE as claimed in claim 18, wherein the first SIM and the second SIM are associated with different network operators.

* * * * *